United States Patent Office 3,660,406
Patented May 2, 1972

3,660,406
2-CHLORO-7-HYDROXY-11-(1-PIPERAZINYL)DI-BENZ[b,f][1,4]OXAZEPINES
Charles Frederick Howell, Upper Saddle River, N.J., and Eugene Newton Greenblatt, Rockland, N.Y., assignors to American Cyanamid Company, Stamford, Conn.
No Drawing. Filed Oct. 26, 1970, Ser. No. 84,221
Int. Cl. C07d 51/70
U.S. Cl. 260—268 TR    4 Claims

ABSTRACT OF THE DISCLOSURE

Preparation of 2-chloro-7-hydroxy-11-(4-substituted-1-piperazinyl)dibenz[b,f][1,4]oxazepines by several methods is described. These compounds are useful for their effects on the central nervous system such as tranquilizers and antidepressants.

DESCRIPTION OF THE INVENTION

This invention relates to new organic compounds, more particularly to 2 - chloro-7-hydroxy-11-(4-substituted-1-piperazinyl)dibenz[b,f][1,4]oxazepines and to intermediates and methods of preparing the same.

The novel compounds of the present invention may be illustrated by the formula:

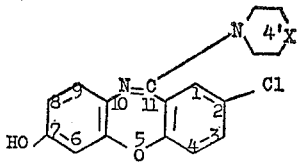

wherein X is selected from the divalent group consisting of $>$NH, $>$N—CH$_3$ and

together with pharmaceutically acceptable non-toxic acid addition salts thereof.

The compounds of this invention are generally moderately high-melting solids which are either colorless to pale yellow or tan. The bases are in general moderately insoluble in water but are more soluble in lower alkanols such as methanol and ethanol. The salts are such as the hydrochloride, sulfate, phosphate, acetate, succinate, tartrate, citrate, and maleate are more soluble in water than the bases. The present compounds are administered either orally or parenterally in doses sufficient to produce a physiologically desirable effect on the central nervous system of warm-blooded animals.

Several procedures are used for preparation of compounds of the present invention. Particularly described are substitution reactions proceeding from known compounds such as 2-chlorodibenz[b,f][1,4]oxazepine - 11 (10H)-one (I). (Flowsheet hereinafter), 2-chloro-11-(4 - methyl - 1 - piperazinyl)dibenz[b,f][1,4]oxazepine (II, R=CH$_3$), and other 2 - chloro-11-(4-substituted-1-piperazinyl)dibenz[b,f][1,4]oxazepines (II). Nitrations are particularly suitable since these reactions lead preponderantly to 7- and 9-substituted derivatives under ordinary conditions wherein the reacting moiety is not protonated at the 10-position or on the substituent attached to the 11-position. The desired 7-substituted isomer is then separated from the isomeric impurity by fractional crystallization or by chromatographic techniques well known to those skilled in the art.

Nitration of the lactam (I) with an appropriate nitrating agent such as nitric acid in dry acetic acid yields a mixture of 7- and 9 - nitro - 2 - chlorodibenz[b,f][1,4]oxazepin-11 (10H)-ones from which the desired 7-nitro isomer (III) separates merely by cooling the reaction mixture. Similarly, nitration of the N-methylpiperazine derivative (II, R=CH$_3$) with, for example, acetyl nitrate in acetic acid yields a mixture of the 7- and 9-nitro isomers which is separated, for example, by partition or by thin layer chromatography (TLC), to give largely the desired 7-nitro isomer. Variously substituted piperazine derivatives (II) such as 11-(4-trifluoroacetyl-, 4-benzyl-, 4-carbobenzyloxy-, and 4 - acetyl - 1 - piperazinyl)-2-chlorodibenz[b,f][1,4]oxazepine are nitrated by similar well known procedures.

The derivatives of compounds (III) and (IV) with substituents in the 7-position are then converted into the desired 7-hydroxy derivatives by a variety of procedures. Reduction of the nitro derivatives yield the 7-amino compounds (V) and (VI). Particularly suitable are chemical reducing agents such as iron, sodium dithionite and zinc which do not attack the aromatic chloro group. Zinc dust in aqueous ethanol containing a small amount of calcium chloride has proven efficacious and is a mild neutral reagent (Examples 3 and 4 hereinafter). It is to be noted that the 7-nitrolactam compound (III) may be converted to derivatives within the piperazinyl series by treatment with any of a variety of imino halide generating agents such as phosphorus pentachloride, phosphorus oxychloride, phosphorus pentabromide and the like followed by treatment of the "activated amide" with the desired piperazine derivative. The reverse transformation may also be effected by boiling the piperazine derivative with dilute aqueous mineral acids.

The amino derivatives compounds (V) and (VI) are then converted to the desired hydroxy compounds by diazotization followed by replacement of the diazonium function either chemically or photochemically. Although the replacement may be effected by diazotizing with an alkali metal or alkaline earth metal nitrite in dilute aqueous mineral acid such as sulfuric or phosphoric acids at low temperature followed by boiling the resulting salt with a copper salt such as cupric sulfate or with aqueous sulfuric acid, the yields of such reactions are inferior to those obtained by an indirect procedure. Preferably, the amine salt is dissolved in acetic acid and diazotized with an alkyl nitrite such as butyl or iso-amyl nitrite. The diazonium salt is then boiled in situ with added acetic anhydride and the resulting 7-acetoxy derivative is stirred overnight with aqueous sodium hydroxide or other hydroxylic base to yield the 7-hydroxy derivative compound (VII). Additionally, the 7-hydroxy lactam is converted to the 7-piperazinyl derivative (VIII, X=$>$N—CH$_3$)

by the methods described above for the 7-nitro lactam (III) though in this case also it is preferable to "block" the hydroxyl function with an acetyl or other suitably labile blocking group such as t-butyl using the methods well known to those skilled in the art.

In addition, the several piperazine derivatives are interconvertible among themselves. For example, the 11-(1 - piperazinyl) derivative (VIII, X=NH) is readily methylated to yield (VIII, X=NCH$_3$) suitably by treatment with formaldehyde and formic acid in a solvent such as dimethylsulfoxide. The N-oxide derivative

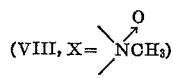

is readily prepared from the N-methyl derivative by oxidation for example with hydrogen peroxide in methanol. The N-oxide may then be reconverted if desired to the N-methyl derivative by heating with triphenyl phosphine in acetic acid or merely by heating under reduced pressure. Additionally, the N-benzyl and N-carbobenzyloxy functions may be converted to the secondary amine compound (VIII, X=NH) by hydrogenolysis and the N-trifluoroacetyl group may be removed by hydrolysis with aqueous base such as sodium or calcium hydroxide. The following flowsheet illustrates the reactions described above.

FLOWSHEET

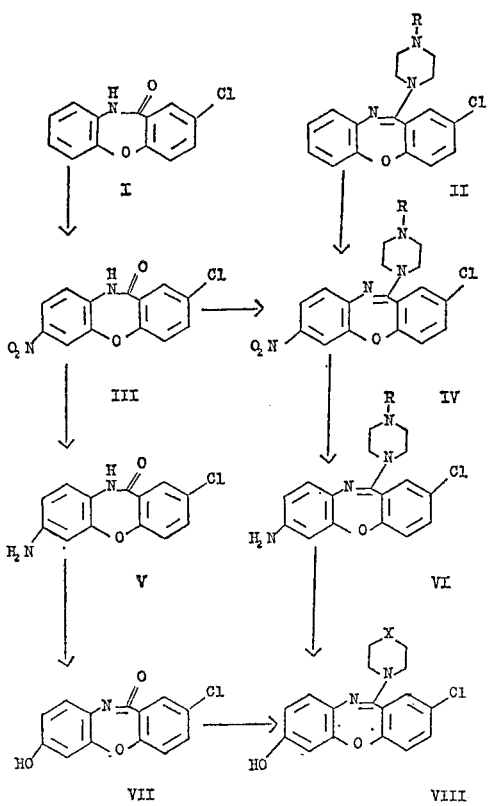

Wherein R is methyl, acetyl, benzyl, carbobenzyloxy or trifluoroacetyl and X is as hereinbefore described.

The compounds of the present invention possess valuable central nervous system (CNS) properties at non-toxic doses. As such, they show one or more of the following CNS actions: tranquilizer, hypnotic and/or muscle relaxant type actions, anti-emetic, anti-anxiety and anti-depressant activity. The compounds have been tested pharmacologically and found to have the above properties which show a desirable wide spread between doses producing depressant or sedative actions or anti-depressant actions and toxic symptoms such as paralysis or lethality.

The CNS depressant properties, such as tranquilizer, hypnotic and muscle relaxant type activity, are indicated by several procedures. For example, a test which indicates hypnotic and/or muscle relaxant type activity is represented by the following rod walking test. Groups of at least 6 mice each are tested for their ability to walk across a horizontal rod in a normal manner after receiving graded intraperitoneal doses of a test compound. A median effective dose, rod walking dose (RWD) is estimated.

A test which indicates tranquilizing activity is represented by a measure of the reduction in motor activity. Fifty milligrams per kilogram (intraperitoneally) is given to a group of 5 mice and a 5 minute count of motor activity is recorded by means of an actophotometer. Counts of ≤250 are considered to indicate a reduction (more than two standard deviations) of activity at a dose causing only minimal impairment of neurological function as measured by rod walking ability. Compounds that appeared to reduce motor activity (≤250 count) are administered to additional groups of 5 mice at graded doses and tested similarly. The motor depressant dose (MDD) which causes a 50% reduction of motor activity is estimated. The use of reduced motor activity as a measure of tranquilizing activity has been described by W. D. Gray, A. C. Osterberg and C. E. Rauh, Archives internationales et de Therapie, vol. 134, p. 198 (1961) and by W. J. Kinnard and C. J. Carr, Journal of Pharmacology and Experimental Therapeutic, vol. 121, p. 354 (1957).

When tested by the above procedure 2-chloro-7-hydroxy - 11 - (4 - methyl - 1 - piperazinyl(dibenz[b,f][1,4] oxazepine exhibits (RWD) and (MDD) activity at 0.7 and 0.02 mg./kg. respectively. These figures are to be contrasted with the activity of the compound lacking only the hydroxy moiety for which the figures are 1.7 and 0.2 respectively in the same tests. In general, for example, among the phenothiazine tranquilizers (A. A. Manian, D. H. Efron and M. B. Goldberg, Life Sciences, vol. 4, p. 2425 (1965)), the phenolic hydroxy derivatives are less potent in animal tests than derivatives lacking that hydrophilic substituent.

The anti-depressant properties of the compounds of the present invention are determined by measuring their ability to counteract a depression induced in animals by the administration of tetrabenazine hexamate. Graded doses of the active compounds of this invention are administered to groups of 5 mice each, according to a sequential procedure described by E. N. Greenblatt and A. C. Osterberg, Toxicology and Applied Pharmacology, vol. 7, pp. 566–578, 1965, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show normal exploratory behavior, but show the well known profound depression induced by tetrabenazine. When tested by the procedure 2-chloro-7-hydroxy-11-(1-piperazinyl)dibenz[b,f][1,4]oxazepine shows anti-depressant activity.

The present compounds, generally in the form of their salts, may be administered orally or parenterally in doses of 0.1 mg. to 10 mg. per kilogram per day and when so administered, are effective central nervous system agents. A dose unit may contain from 1.0 mg. to 50 mg. of drug. For oral administration the new compounds of this invention may be incorporated with the usual pharmaceutical excipients and used for instance, in the form of tablets, capsules, dragées, liquids to be administered in drops, emulsions, suspensions and syrups, and in chocolate, candy, chewing gum and the like. They may also be administered in suppositories, and in aqueous solutions for parenteral injection.

SPECIFIC DETAILS

The following examples describe various methods by which the present compounds can be prepared.

EXAMPLE 1

Preparation of 2-chloro-7-nitrodibenz[b,f][1,4]oxazepin-11(10H)-one

To a solution of 34.5 g. of chlorodibenz[b,f][1,4] oxazepin-11(10H)-one in 1 liter of acetic acid at 90° C. is added dropwise 22.4 ml. of an acetyl nitrate solution prepared previously by slowly adding 10.4 ml. of red fuming nitric acid to an ice cold mixture of 9.5 ml. of acetic acid and 9.25 ml. of acetic anhydride. The red fuming solution deposits nearly colorless crystals after 5–10 minutes and the addition takes about 30 minutes. After 3 hours at 90–95° C. the mixture is cooled to 25° C. and filtered. [The filtrate on dilution with water (1 liter) deposits the bulk (3.4 g.) of the yellow 9-nitro isomer.] The colorless crystalline solid is washed with acetic acid and ether and dried to give 17.8 g. (62%) of colorless 2 - chloro - 7 - nitrodibenz[b,f][1,4]oxazepin-11(10H)-one, melting point 345–350° C. When recrystallized from 250 parts of acetic acid, the fine, colorless needles have melting point of 358–359° C., or melting point 360° C. after sublimation; ultraviolet (uv.) max. (CH₃OHHCl) 330, (broad; br.) 295, mµ; infrared (ir.) (KBr) 5.75, 6.45, 7.4µ.

EXAMPLE 2

Preparation of 2-chloro-11-(4-methyl-1-piperazinyl)-7-nitrobenz[b,f][1,4]oxazepine (A) A suspension of 5.8 2-chloro-7-nitrodibenz[b,f][1,4]oxazepin-11(10H)-one (Example 1) in 80 ml. of o-dichlorobenzene is heated and the solvent is distilled into an alembic to dry equipment and reagents. The mixture is cooled and treated with 5.9 g. of phosphorus pentachloride. The mixture is heated and 20 ml. of distillate is collected which contains the phosphorus oxychloride formed in the reaction. The slightly cooled solution is treated with 10 ml. of N-methylpiperazine, heated to reflux 10 minutes and cooled. The solution is extracted with two 100-ml. portions of N-hydrochloric acid and the oily base is precipitated from the aqueous (top) layer with concentrated ammonium hydroxide. The base is collected, dissolved in 80 ml. of 2 N acetic acid, treated with activated charcoal, filtered and reprecipitated. Magnetic stirring with a small amount of methanol overnight gives orange crystals of 2-chloro-11-(4-methyl-1-piperazinyl)-7-nitrodibenz[b,f][1,4]oxazepine, melting point 161–168° C. uv. max (CH₃OH) 352, 300 mµ; ir. (KBr) 3.6, 6.3, 6.5, 7.5, 9.95µ.

(B) To a solution of 3.27 g. of 2-chloro-11-(4-methyl-1 - piperazinyl)dibenz[b,f][1,4]oxazepine in 3 ml. of acetic anhydride and 5 ml. of acetic acid at 0° C. is added 3 ml. of acetyl nitrate prepared as described in Example 1. The solution is stirred 1 hour each at 0° C. and 25° C. and poured onto 30 g. of ice. The aqueous layer is decanted and the orange oil is washed again with water. The oil is stirred with dilute ammonium hydroxide, redissolved in 40 ml. of 10% hydrochloric acid and precipitated again with ammonium hydroxide to give 2.14 g. of a mixture with at least 3 yellow compounds when subjected to thin layer chromatography (TLC) on silica gel plates developed with 5% methanol in ether. Partition chromatography of 1.6 g. of this mixture using heptane-methanol on 1.1 kg. of diatomaceous earth gives in the second hold-back volume 707 mg. (27%) of 2-chloro-11-(4 - methyl - 1 - piperazinyl)-7-nitrodibenz [b,f][1,4]oxazepine with melting point, ir. and TLC indistinguishable from a sample prepared by procedure A.

EXAMPLE 3

Preparation of 7-amino-2-chlorodibenz[b,f][1,4]oxazepine-11(10H)-one

A suspension of 5.8 g. of 2-chloro-7-nitrodibenz[b,f][1,4]oxazepin-11(10H)-one (Example 1) and 42 g. of zinc dust previously washed with dilute hydrochloric acid is refluxed with 140 ml. of 78% aqueous ethanol and 14.4 ml. of the calcium chloride solution prepared by dissolving 10 g. of calcium chloride in 10 ml. of water. Vigorous stirring and refluxing for 20 hours is necessary for complete reduction. The reaction mixture is filtered and the filter cake exhaustively extracted with hot ethanol. Concentration of the filtrate yields crude product which is washed with 2 N acetic acid and water to remove zinc salts and then sublimed to give 4.7 g. (90%) of 7-amino - 2 - chlorodibenz[b,f][1,4]oxazepin-11(10H)-one, melting point 227.5–229° C.; uv. max. (CH₃OH) 295, 247 mµ; ir. (KBr) 3.15, 3.3, 6.0, 6.1, 6.5µ.

Reduction with zinc dust in acetic acid containing concentrated hydrochloric acid is also effective but the product is contaminated with the 7-acetamido derivative.

EXAMPLE 4

Preparation of 7-amino-2-chloro-11-(4-methyl-1-piperazinyl)dibenz[b,f][1,4]oxazepine To a suspension of 3.72 g. of 2-chloro-11-(4-methyl-1-piperazinyl)-7-nitrobenz[b,f][1,4]oxazepine in 72 ml. of 78% aqueous ethanol is added 7.2 ml. of a solution of calcium chloride (Example 3) followed by 21 g. of acid-washed zinc dust. The mixture is stirred and refluxed for 2 hours and then filtered and concentrated. The base is dissolved in 120 ml. of 0.25 N hydrochloric acid containing a little sodium bisulfite and then precipitated with ammonium hydroxide. Recrystallization from ethyl acetate and from ethanol affords yellow prisms of 7-amino-2-chloro-11-(4-methyl - 1 - piperazinyl)dibenz[b,f][1,4]oxazepine, melting point 214–216° C.; uv. max. (CH₃OH) 355 (br.), 273 mµ; ir. (KBr) 2.9, 3.0, 3.1, 3.6, 6.15, 6.25, 9.95µ.

EXAMPLE 5

Preparation of 2-chloro-7-hydroxydibenz[b,f][1,4]oxazepin-11(10H)-one

To a warm solution of 5.2 g. of 7-amino-2-chlorodibenz[b,f][1,4]oxazepin-11(10H)-one in 60 ml. of glacial acetic acid is added 22 ml. of N sulfuric acid in acetic acid and the resulting suspension is cooled to 20° C. The mixture is treated with 4.5 ml. of i-amyl nitrite and stirred at 20–30° C. for 1 hour and warmed to 60° C. to complete the diazotization. The solution is treated with 50 ml. of acetic anhydride and heated cautiously to 110° C. when nitrogen evolution becomes vigorous. The reaction is completed by refluxing for 30 minutes and then pouring onto 400 g. of ice. This 7-acetoxy product is collected on a filter and then stirred overnight with 200 ml. of 2 N sodium hydroxide. The resulting solution is treated with activated charcoal, filtered and treated with saturated ammonium chloride solution (pH ca. 8). The product is collected and sublimed under reduced pressure to give 3.2 g. (61%) of 2-chloro-7-hydroxydibenz[b,f][1,4]oxazepin-11(10H)-one, melting point 267–271° C. indistinguishable by ir. and TLC from a sample melting point 266–9° C. which gave uv. max. (CH₃OH) 287 mµ and ir. (KBr) 3.2, 6.0, 6.07, 6.27µ.

EXAMPLE 6

Preparation of 2-chloro-7-hydroxy-11-(4-methyl-1-piperazinyl)dibenz[b,f][1,4]oxazepine (A) To a solution of 684 mg. of 7-amino-2-chloro-11-(4-methyl-1-piperazinyl)dibenz[b,f][1,4]oxazepine in 6 ml. of glacial acetic acid is added 4.4 ml. of N sulfuric acid in acetic acid with stirring. The resulting precipitate is treated with 0.45 ml. of iso-amyl nitrite and stirred at room temperature for 1.5 hours. The solution is treated with 5 ml. of acetic anhydride, warmed cautiously to 90° C. and, after the evolution of nitrogen has subsided, refluxed 10 minutes. The solution is diluted with water to 100 ml., treated with activated charcoal, filtered and treated with conc. ammonium hydroxide. The precipitate is extracted with dichloromethane and the resulting solution is concentrated. The residue is then stirred with 10 ml. each of N potassium hydroxide and ethanol overnight, diluted with 10 ml. of water and filtered again with activated charcoal. The product is precipitated with a saturated solution of ammonium chloride and subjected to preparative TLC on silica gel plates developed with 10% methanol in ether. The major band (detected by quenching of the fluorescence of the TLC plate) is eluted with methanol and concentrated. The residue is taken up in 2 N acetic acid, filtered and precipitated with ammonium hydroxide to yield 225 mg. (33%) of 2-chloro - 7 - hydroxy-11-(4-methyl-1-piperazinyl)dibenz[b,f][1,4]oxazepine, melting point 247–257° C. (dec.). When purified by sublimation this compound has melting point 252–257° C. (dec.); uv. max. (CH₃OH) 340 (br.), 300 (br.), 253 mµ; ir. (KBr) 3.6, 6.2, 6.8, 9.0µ.

(B) A suspension of 606 mg. of 7-acetoxy-2-chlorodibenz[b,f][1,4]oxazepin-11(10H) - one (melting point 240–245° C.), prepared by boiling the 7-hydroxy lactam (Example 5) with acetic anhydride, in 15 ml. of toluene is partially distilled, treated with phosphorus pentachloride and then with N-methylpiperazine by the procedure A of Example 2. There is obtained 419 mg. (61%) of 2 - chloro - 7 - hydroxy - 11 - (4 - methyl - 1 - piperazinyl)dibenz[b,f][1,4]oxazepine, melting point 232–244° C. (dec.) without chromatographic purification but having ir. and TLC behavior substantially identical with a sample made by procedure A.

(C) To about 23 mg. of 2-chloro-7-hydroxy-11-(1-piperazinyl)dibenz[b,f][1,4]oxazepine (Example 7) is added 0.3 ml. of dimethylsulfoxide and 0.1 ml. each of 37% formaldehyde and 97% formic acid. The solution is heated on steam bath 1 hour to complete evolution of carbon dioxide, diluted with 2 ml. of water, treated with concentrated ammonium hydroxide, and cooled. Filtration yields 19 mg. (67%) of 2-chloro-7-hydroxy-11-(4-methyl-1-piperazinyl)dibenz[b,f][1,4]oxazepine, melting point 248–250° C. (dec.) with ir. and uv. spectra identical with that prepared by method A.

(D) Heating the corresponding N-oxide (Example 8) with excess triphenylphosphine in acetic acid at 90–100° C., for 2 hours yields the same product. Heating the N-oxide also gives the above base but sublimation under reduced pressure at 190° is particularly effective since the product is purer.

EXAMPLE 7

Preparation of 2-chloro-7-hydroxy-11-(1-piperazinyl) dibenz[b,f][1,4]oxazepine

The procedure of Example 6B is repeated except that piperazine dissolved in anhydrous (potassium hydroxide-dried) pyridine is substituted N-methylpiperazine. There is obtained 2-chloro-7-hydroxy-11-(1-piperazinyl)dibenz [b,f][1,4]oxazepine which has melting point 259–268° C. when purified by preparative (TLC) using methanol for development and elution, uv. max. (CH₃OH, 337, 300 (br.) 253 mµ; ir. (KBr) 3.5, 3.6, 6.3, 9.0, 9.7µ.

EXAMPLE 8

Preparation of 2-chloro-7-hydroxy-11-(4-methyl-1-piperazinyl)dibenz[b,f][1,4]oxazepine 4'-oxide hydrate A suspension of 333 mg. of 2-chloro-7-hydroxy-11-(4-methyl-1-piperazinyl)dibenz[b,f][1,4]oxazepine in 4 ml. of methanol containing 0.2 ml. of 30% hydrogen peroxide is stirred at room temperature for 15 days at which point the starting material has all dissolved. The solution is applied to two 20 x 20 x 0.1 cm. silica gel TLC plates, developed and eluted with methanol. Elution of the more polar band (12% of less polar starting material is recovered) yields, after concentration and recrystallization from iso-propanol-ether 130 mg. of 2-chloro-7-hydroxy-11-(4-methyl - 1 - piperazinyl)dibenz[b,f][1,4]oxazepine 4'-oxide hydrate, melting point 261–264° C. (gas evolution); uv. max. (CH₃OH) 337 (br.), 300 (br.), 250 mµ; ir. (KBr) 3.5, 6.2, 8.0, 9.0, 10.2, 10.3µ.

*Analysis.*—Calcd. for $C_{18}H_{18}ClN_3O_3 \cdot H_2O$ (perecnt): C, 57.2; H, 5.3; N, 11.1; Cl, 9.4; H₂O, 4.7. Found (percent): C, 58.5; H, 5.1; N, 11.2; Cl, 9.1; H₂O, 4.2.

We claim:
1. A compound of the formula:

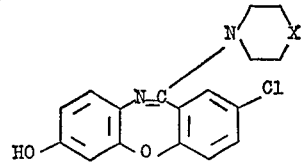

wherein X is selected from the divalent group consisting of >NH, >NCH₃ and

and pharmaceutically acceptable non-toxic acid addition salts thereof.

2. The compound in accordance with claim 1, 2-chloro-7-hydroxy-11-(4 - methyl-1-piperazinyl)dibenz[b,f][1,4] oxazepine.

3. The compound in accordance with claim 1, 2-chloro-7-hydroxy-11(1-piperazinyl)dibenz[b,f][1,4]oxazepine.

4. The compound in accordance with claim 1, 2-chloro-7-hydroxy-11-(4 - methyl-1-piperazinyl)dibenz[b,f][1,4] oxazepine 4'-oxide.

References Cited

UNITED STATES PATENTS

| | | | |
|---|---|---|---|
| 3,341,533 | 8/1967 | Yale | 260—243 AA |
| 3,412,193 | 11/1968 | Coppola | 260—268 TR |
| 3,458,516 | 7/1969 | Howell | 260—268 TR |
| 3,539,573 | 10/1970 | Schmutz et al. | 260—268 TR |
| 3,546,226 | 12/1970 | Schmutz et al. | 260—268 TR |

OTHER REFERENCES

Lund, in Chem. Abstr., vol. 66, col. 1, 0838a (1966).

DONALD G. DAUS, Primary Examiner

U.S. Cl. X.R.

260—239.3 T; 424—250